United States Patent Office 3,328,306
Patented June 27, 1967

3,328,306
FOAM INHIBITING COMPOSITION AND FOAM INHIBITED PHOSPHATING PROCESS
David G. Ellis, deceased, late of Ohio, by Jean J. Ellis, administratrix, Wickliffe, Ohio, assignor to The Lubrizol Corporation, Wickliffe, Ohio, a corporation of Ohio
No Drawing. Filed Oct. 4, 1965, Ser. No. 492,942
7 Claims. (Cl. 252—99)

This is a continuation-in-part of co-pending application Ser. No. 196,450, filed May 21, 1962, now abandoned.

This invention relates to novel compositions and in a more particular sense it relates to compositions adapted for the cleaning of metal articles prior to a surface treatment thereof. It relates also to a process of treating metal surfaces to improve their corrosion resistance.

In the metal finishing industry it is known that a metal article must be thoroughly cleaned prior to subjecting it to surface treatment such as phosphating, anodizing, bluing, staining, etc. If the metal article has not been cleaned adequately, satisfactory results are not secured in subsequent surface treatment operations. Thus, it becomes important to provide a method for cleaning a metal article in a manner so as to insure the success of later surface treatment operations.

Nearly all unfinished metal articles, e.g., plate steel, steel strip stock, rough core castings, etc., bear surface contaminants such as drawing compounds, slushing oils, cutting oils, core compounds, and the like. It is a common practice in the industry to clean such unfinished metal articles by subjecting them to the action of cleaning compositions which often are aqueous solutions containing one or more alkali materials such as sodium hydroxide, potassium hydroxide, trisodium phosphate, sodium carbonate, sodium silicates, sodium polyphosphates, etc. A particularly troublesome problem is encountered in the cleaning of metal articles which have been subjected to drawing operations in the presence of soaps used as the drawing compound. The soaps cause excessive foaming of the cleaning solutions and the foaming makes it difficult to carry out the cleaning operation.

Accordingly it is an object of this invention to provide novel compositions of matter.

It is also an object of this invention to provide compositions adapted for use in the cleaning solutions for metal articles.

It is also an object of this invention to provide anti-foam compositions useful in solutions for cleaning metal articles prior to a surface treatment thereof.

It is another object of this invention to provide foam-resistant compositions useful for cleaning metal articles prior to the treatment thereof with rust proofing phosphating solutions.

It is another object of this invention to provide a process of preparing metal surfaces for rust-proofing treatments.

It is another object of this invention to provide a process of treating metal surfaces.

These and other objects are attained in accordance with this invention by providing an anti-foam composition comprising from about 1 to 10 parts by weight of a water-soluble oxyalkylene alcohol having the structural formula R—(O—R'—)$_n$OH wherein R is selected from the class consisting of hydrogen and lower aliphatic radicals, R' is an alkylene radical, and $n$ is an integer from 1 to 150, and from about 1 to 10 parts by weight of a metal hypochlorite wherein the metal is selected from the class consisting of alkali metals and alkaline earth metals.

The water-soluble oxyalkylene alcohols useful in the above anti-foam composition are preferably those in which R radical is hydrogen or a lower alkyl radical, i.e., one having less than about 8 carbon atoms. Examples of the lower alkyl radicals include methyl, ethyl, isobutyl, n-butyl, n-pentyl, cyclohexyl, cyclopentyl, isooctyl, tert-octyl, neopentyl, 4-methyl-2- pentyl, and 1,1,2,2-tetramethyl propyl radicals. The R radical likewise may be decyl, dodecyl, octadecyl, or nonyl radicals. The radical further may contain a polar substituent such as chloro, bromo, nitro, or ether group. The R', i.e., the alkylene radical of the oxyalkylene alcohol is preferably a lower alkylene radical, i.e., one having less than about 8 carbon atoms. Especially useful are the ethylene radicals and substituted ethylene radicals such as propylene, 1,2-butylene, 2,3-hexylene, or 1,2-pentylene radicals. Other examples of the R' radicals are trimethylene, tetramethylene, pentamethylene, hexamethylene, octamethylene, 1,2-hexylene, 2,3-hexylene, 1,1,2,2-tetramethyl-ethylene, and 1,3-pentylene radicals.

The oxyalkylene alcohols in which there are about 10 to 100 oxyalkylene radicals are especially useful in the composition of this invention. Others having more or less oxyalkylene radicals likewise are contemplated for use herein. They include, for example, the oxyalkylene alcohols defined by the above structural formula in which $n$ may vary from 1 to as high as 150.

A convenient method for preparing the oxyalkylene alcohols comprises the reaction of an alcohol or glycol of the formula R''—OH in which R'' is an alkyl or hydroxy alkyl radical with an appropriate amount of an epoxide of the formula

in which R' is as defined previously. The reaction usually is catalyzed by a base such as sodium hydroxide, potassium hydroxide, calcium oxide, barium hydroxide, calcium alcoholate, sodium alcoholate, sodium, calcium, barium, sodium hydride, sodium phenate, or the like. The reaction may be carried out under super-atmospheric pressure. The temperature at which the reaction between the alcohol and the epoxide is carried out may be varied within wide ranges such as from room temperature to 250° C. Ordinarily it is 50°–150° C. The reaction may be represented by the following equation:

It should be noted that the incorporation of the oxyalkylene radicals in the product may be step-wise. Thus, an intermediate product of the structure R''—(OR')$_{n-10}$OH may react further with an additional 10 moles of the epoxide to give R''—(OR'—)$_n$OH.

An alternative method for preparing the oxyalkylene alcohols involves first converting the alcohol or glycol to a metal alcoholate such as sodium alcoholate or calcium alcoholate and then reacting the alcoholate with the desired proportions of the epoxide.

The epoxide used to prepare the oxyalkylene alcohols are for the most part alkylene oxides including, for example, ethylene oxide, propylene oxide, 1,2-butene oxide, trimethylene oxide, tetramethylene oxide, butadiene monoepoxide, 1,2-hexene oxide, 2,3-butene oxide, 1,2-decene oxide, or epoxidized heptadecene. The epoxides may contain a polar substituent, usually a halo radical such as chloro, fluoro, bromo, or iodo; an ether radical such as methoxy; or an ester radical such as carbomethoxy or carbobutoxy radical.

As indicated previously, the metal hypochlorites useful in the composition of this invention, may be alkali metal or alkaline earth metal hypochlorites. They are exemplified by sodium hypochlorite, potassium hypochlorite, calcium hypochlorite, barium hypochlorite, magnesium hypochlorite, and strontium hypochlorite. Of these, calcium hypochlorite is preferred.

The compositions of this invention are adapted for use in compositions, especially aqueous solutions, for the cleaning of metal articles such as ferrous, galvanized or aluminized articles before a subsequent surface treatment thereof. The cleaning solutions usually are dilute aqueous solutions of alkali metal phosphates or silicates such as alkali metal phosphates and polyphosphates and silicates. The more commonly used cleaning substances are illustrated by sodium orthophosphate, sodium pyrophosphate, sodium metaphosphate, sodium metasilicate, sodium orthosilicate, sodium tripolyphosphate, potassium tripolyphosphate, potassium orthophosphate, potassium metasilicate, etc. Sodium tripolyphosphate is especially preferred.

The concentration of the cleaning substance in the solution usually ranges from about 0.1 to about 5% (by weight) more often within the range from about 0.5% to 2%. The concentration of each of the components of the anti-foam composition of this invention in the cleaning solution usually ranges from about 0.001% to about 1%. The cleaning solution preferably contains from about 0.005% to 0.05% of an oxyalkylene alcohol such as one having the structural formula

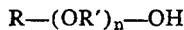

$$R-(OR')_n-OH$$

wherein R is a butyl radical, R' is a mixture of ethylene and propylene radicals, and $n$ is from about 10 to about 100, and from about 0.005% to 0.05% of a metal hypochlorite such as calcium hypochlorite. It is often convenient for purposes of storage and transportation to prepare a mixture of the anti-foam composition of this invention with the cleaning substance or to prepare a concentrate of such a mixture in a relatively small amount of water. The water-free mixture or the concentrate may then be diluted with additional amounts of water to prepare the final cleaning solution.

The metal article to be cleaned is contacted with the cleaning solution, usually at an elevated temperature in the range from about 100° F. to about 212° F. and preferably in the range from about 120° F. to about 190° F. If desired, temperatures above 212° F., such as 250° F., 300° F., or higher can be employed by contacting the metal article with the solution at super-atmospheric pressures. The contacting of the metal article with the solution may be accomplished by any of the ordinary techniques employed in the metal finishing industry such as dipping, spraying, tumbling, brushing, etc. Spraying appears to be the most effective and, therefore, preferred method. Depending on the character and quantity of the soil present on the metal article and the technique of applying the solution, the time of cleaning will vary from as little as one or two seconds to ten minutes or more. In most cases, one or two minutes is sufficient to clean the article thoroughly.

After the article has been cleaned, it is optionally rinsed with water and/or a water-soluble alcohol. Subsequent surface treatments such as phosphating, anodizing, bluing, etc., are preferably carried out on the cleaned metal article without delay, since the cleaned article, particularly if it is made from a ferrous metal, is very susceptible to oxidation or rusting.

Metal articles cleaned by the hereindescribed method have been found to be very receptive to phosphate coatings. Such coatings, which are widely used in the metal finishing industry to inhibit oxidation or rusting and to form an adherent substrate for the subsequent application of organic coating compositions such as paint, varnish, enamel, lacquer, synthetic resins, organosols, etc., are generally formed on a metal surface by means of aqueous solutions which contain the phosphate ion and, optionally, certain auxiliary ions including metallic ions such as sodium, manganese, zinc, cadmium, iron, copper, lead, nickel, cobalt, and antimony ions, and non-metallic ions such as ammonium, chloride, bromide, nitrate, and chlorate ions. These auxiliary ions modify the character of the phosphate coating and adapt it for a wide variety of applications. The preparation and use of aqueous phosphating solutions is well-known in the metal finishing industry as shown by U.S. Patents 1,206,075, 1,247,668, 1,305,331, 1,485,025, 1,610,362, 1,980,518, 2,001,754, and 2,859,145.

Aqueous phosphating solutions are generally prepared by dissolving in water minor amounts of phosphoric acid and, optionally, a metal salt such as a nitrate, phosphate, nitrite, sulfate, chloride, or bromide of manganese, sodium, zinc, cadmium, iron, nickel, copper, lead, or antimony. Ordinarily an accelerator such as sodium chlorate, potassium perborate, sodium nitrate, sodium nitrite, ammonium nitrate, sodium chlorite, potassium perchlorate, or hydrogen peroxide is included in the phosphating solution to depolarize the metal surface being treated and thereby increase the rate at which the phosphate coating is formed on the metal surface. Other auxiliary agents such as anti-sludging agents, coloring agents, and metal cleaning agents may also be incorporated in the phosphating solution. One common type of commercial phosphating bath which contains zinc ion, phosphate ion, and a depolarizing agent is made by dissolving small amounts of zinc dihydrogen phosphate, sodium nitrate, and phosphoric acid in water.

In order to provide commercially satisfactory coating weights and coating speeds, an aqueous phosphating solution should generally have a total acidity within the range from about 5 to about 100 points, preferably from about 5 to about 50 points. It is possible, however, by certain special techniques to employ phosphating solutions having a total acidity substantially higher than 100 points, e.g., 125, 200, 250, or 300 points or more. The term "points total acidity" as employed in the phosphating art represents the number of milliliters of 0.1 normal sodium hydroxide solution required to neutralize a 10 milliliter sample of a phosphating solution in the presence of phenolphthalein as an indicator.

A particularly desirable and effective class of aqueous phosphating solutions of baths, is set forth in application Ser. No. 373,449, filed Aug. 10, 1953, now U.S. 3,090,709. It is intended that the disclosure of the said application be considered as forming a part of the present specification. The phosphating solutions described therein have a total acidity within the range from about 5 to about 100 points and contain as essential ingredients zinc ion, phosphate ion, nitrate ion, and an ion selected from the group consisting of lithium, beryllium, mangnesium, calcium, strontium, cadmium, and barium ions. Of the several metallic ions enumerated, the calcium ion is preferred. Such phosphating solutions provide a dense, adherent, micro-crystalline or amorphous phosphate coating which shows substantially no visible crystal structure at a magnification of 100 diameters and which is preferred for the purposes of the present invention. A particularly useful sub-group of aqueous phosphating solutions for the purposes of this invention have a total acidity within the range from about 5 to about 100 points and contain as essential ingredients from about 0.1 to about 1.0 percent of zinc ion, from about 0.25 to about 2.0 percent of phosphate ion, from about 0.25 to about 8.0 percent of nitrate ion, and from about 0.1 to about 4.0 percent of calcium ion.

In view of the extensive commercial development of the phosphating art and the many journal publications and patents describing the application of phosphating solutions, it is believed unnecessary to lengthen this specification unduly by a detailed recitation of the many ways in which the phosphating step may be accomplished. Suffice it to say that any of the commonly used phosphating techniques such as spraying, brushing, dipping, roller-coating, or flow-coating may be employed, and that the temperature of the aqueous phosphating solutions may vary within wide limits, e.g., from room temperature to about 212° F. In general, best results are obtained when the phosphating solution is used at a temperature within the range from about 120° F. to about 210° F. If desired, however, the aqueous phosphating bath may be used at higher temperatures, e.g., 225° F., 250° F., or even 300° F., by employing superatmospheric pressures.

The phosphating operation is usually carried out until the weight of the phosphate coating formed on the cleaned metallic surface is at least about 25 mg. per square foot of surface area and is preferably within the range from about 50 to about 1000 mg. per square foot of surface area. The time required to form the phosphate coating will vary according to the temperature, the type of phosphating solution employed, the particular technique of applying the phosphating solution, and the coating weight desired. In most instances, however, the time required to produce a phosphate coating of the weight preferred for the purposes of the present invention will be within the range from about 5 seconds to about 15 or 20 minutes.

Upon completion of the phosphating operation, the phosphated metal article is rinsed, optionally, with water and/or a hot, dilute aqueous solution of chromic acid containing from about 0.01 to about 0.2 percent of $CrO_3$. The chromic acid rinse appears to "seal" the phosphate coating and improve its utility as a base for the later application of paint, lacquer, varnish, and other organic coating compositions. In lieu of the dilute aqueous chromic acid, dilute aqueous solutions of metal chromates, metal dichromates, chromic acid-phosphoric acid mixtures, and chromic acid-metal dichromate mixtures may be used.

The following examples are illustrative of the anti-foam compositions and the cleaning compositions of this invention (parts are by weight).

Example 1 (anti-foam composition):

| | Parts |
|---|---|
| n-Butyl-(oxyethylene)$_{50}$OH | 50 |
| Sodium hypochlorite | 50 |

Example 2 (anti-foam composition):

| | |
|---|---|
| n-Octyl-(oxypropylene)$_{100}$OH | 50 |
| Sodium hypochlorite | 25 |
| Calcium hypochlorite | 25 |

Example 3 (cleaning mixture):

| | |
|---|---|
| butyl-(oxypropylene)$_{100}$OH | 5 |
| Calcium hypochlorite | 5 |
| Sodium tripolyphosphate | 90 |

Example 4 (aqueous cleaning solution):

| | |
|---|---|
| Hexyl-(oxypropylene)$_{75}$OH | 1 |
| Calcium hypochlorite (containing 30% of calcium hydroxide) | 0.1 |
| Sodium tripolyphosphate | 0.1 |
| Water | 98.8 |

Example 5 (aqueous cleaning solution):

| | |
|---|---|
| H-(oxypropylene)-(oxyethylene)$_{35}$OH | 0.5 |
| Potassium hypochlorite | 0.05 |
| Sodium orthophosphate | 0.05 |
| Water | 99.4 |

Example 6 (cleaning concentrate):

| | |
|---|---|
| Butyl-(oxyethylene)$_{90}$(oxypropylene)$_{10}$OH | 5 |
| Calcium hypochlorite (containing 20% of calcium hydroxide) | 5 |
| Sodium pyrophosphate | 60 |
| $H_2O$ | 30 |

The anti-foam composition of this invention is especially desirable in cleaning solutions used in applications where excessive foaming may occur. Such applications, for instance, are encountered in the cleaning of metal articles which have been subjected to drawing operations in the presence of a soap as the drawing compound such as water-soluble alkali metal salts of aliphatic carboxylic acids having up to about 24 carbon atoms or sulfonic acids having up to about 18 aliphatic carbon atoms, e.g., sodium stearate, potassium myristate, sodium dodecylbenzenesulfonate, etc. The soap causes excessive foaming of the cleaning solution. In accordance with this invention the presence of a small amount of the anti-foam composition described herein prevents foaming and enables the cleaning solution to prepare satisfactorily the metal article for subsequent surface treatment such as phosphating, anodizing, bluing or staining.

An example of the process for preparing a ferrous surface for phosphating treatments involves first cleaning the surface with a dilute aqueous cleaning solution in which there are present from about 0.5% to 2% (by weight) of sodium tripolyphosphate, from about 0.001% to about 1% of the water-soluble oxyalkylene alcohol and the metal hypochlorite of this invention and then contacting the surface with the phosphate solution. As indicated previously, the metal surface which has been treated with the cleaning composition of this invention may optionally be rinsed with water or a water-soluble alcohol such as methanol, ethanol or isopropanol. The process is further illustrated as follows: A ferrous surface is dipped in an aqueous solution containing 1% (by weight) of sodium tripolyphosphate, 0.1% of H-oxypropylene)$_{50}$-(oxyethylene)$_5$OH and 0.1% of calcium hypochlorite at 150° F. for two hours. The surface is then rinsed with water and then dipped in an aqueous phosphating bath containing 4% (by weight), of phosphoric acid, 5% of mono-ammonium phosphate, 2.5% of zinc chloride and 5% of calcium nitrate at 150° F. The phosphated surface is then rinsed with water.

The effectiveness of the anti-foam compositions of this invention is shown by the following foam test: A 500-ml.

FOAM TEST

| Aqueous Cleaning Solution (Percent by weight) Containing— | Foam Result—Time in Seconds to Produce Foam of— | | | | |
|---|---|---|---|---|---|
| | 100 ml. | 200 ml. | 300 ml. | 400 ml. | 500 ml. |
| (I) 0.05% of Soap (e.g., potassium stearate), 0.713% of Sodium tripolyphosphate. | 8 | 15 | 25 | 35 | 45 |
| (II) 0.05% of Soap (e.g., potassium stearate), 0.713% of Sodium tripolyphosphate, 0.0375% of H-(O-alkylene)$_n$-OH having a molecular weight of 1,500–1,800 in which the alkylene radical is a mixture of 90% of propylene and 10% of ethylene. | 12 | 28 | 40 | 50 | 60 |
| (III) 0.05% of Soap (e.g., potassium stearate), 0.713% of Sodium tripolyphosphate, 0.0375% of the H-(O-alkylene)$_n$-OH of (II), 0.375% of commercial grade of calcium hypochlorite containing about 27% of calcium hydroxide and about 63% of calcium hypochlorite. | (A maximum of 150 ml. of foam: produced at end of 40 seconds) | | | | |
| (IV) 0.05% of Soap (e.g., potassium stearate), 0.713% of Sodium tripolyphosphate, 0.0375% of Butyl-(O-alkylene)$_n$-OH having a molecular weight of 5,100 in which the alkylene radical is a mixture of propylene and ethylene, 0.375% of commercial grade of Calcium hydrochlorite containing about 27% of calcium hydroxide and about 63% of calcium hypochlorite. | (A maximum of 150 ml. of foam: produced at end of 1 minute) | | | | | sample of a cleaning solution to which there is also added potassium stearate as the foam-forming soap is placed in a graduated cylinder and is blown with air through an air diffuser at a rate of 0.6 cubic foot per hour at 160° F. The time is noted which is required to produce 100 ml., 200 ml., 300 ml., 400 ml., and 500 ml., of foam. The longer the time for producing the foam, the greater the foam resistance of the cleaning solution. Also, if the cleaning solution is extremely resistant to foam, there will be a maximum volume of the foam that can be produced regardless of the length of the time of air-blowing. The results are summarized in the above table.

What is claimed is:

1. In the process of preparing a ferrous surface for phosphating, wherein said surface is cleaned by the treatment thereof with a dilute aqueous cleaning solution having the tendency to foam and consisting essentially of a cleaning substance selected from the class consisting of sodium phosphates, potassium phosphates, sodium silicates, and potassium silicates, the improvement comprising reducing the foaming tendency of said solution by incorporating therein from about 0.001% to 1% of a water-soluble oxyalkylene alcohol having the structural formula $$R-(OR')_n-OH$$

wherein R is selected from the class consisting of hydrogen and alkyl radicals having less than about 8 carbon atoms, R' is an alkylene radical having less than about 8 carbon atoms, and $n$ is an integer from 1 to 150, and from about 0.001% to 1% of a metal hypochlorite wherein the metal is selected from the class consisting of alkali metals and alkaline earth metals.

2. The improvement of claim 1 characterized further in that in the oxyalkylene alcohol R is a butyl radical, R' is an ethylene radical and $n$ is from about 10 to 100.

3. The improvement of claim 1 characterized further in that in the oxyalkylene alcohol R is a butyl radical, R' is a propylene radical and $n$ is from about 10 to 100.

4. The improvement of claim 1 characterized further in that in the oxyalkylene alcohol R' is an ethylene radical.

5. The improvement of claim 1 characterized further in that in the oxyalkylene alcohol R' is a propylene radical.

6. The improvement of claim 1 characterized further in that the metal hypochlorite is calcium hypochlorite.

7. In the process of preparing a ferrous surface for phosphating, wherein said surface is cleaned by the treatment of a dilute aqueous cleaning solution having the tendency to foam and consisting essentially of a cleaning substance selected from the class consisting of sodium silicates and potassium silicates and containing from about 0.1% to 5% of an alkali metal tripolyphosphate wherein the alkali metal is selected from the class consisting of sodium and potassium, the improvement comprising reducing the foaming tendency of said solution by incorporating therein from about 0.005% to 0.05% of an oxyalkylene alcohol having the structural formula $$R-(OR')_n-OH$$

wherein R is a butyl radical, R' is a mixture of ethylene and propylene radicals wherein the ratio of ethylene radicals to propylene radicals is 10:90 and $n$ is from about 10 to 100, and from about 0.005% to 0.05% calcium hypochlorite.

References Cited

UNITED STATES PATENTS

| | | | |
|---|---|---|---|
| 2,415,657 | 2/1947 | Riggs et al. | 252—187 X |
| 2,471,908 | 5/1949 | Snyder | 148—6.15 |
| 2,499,261 | 2/1950 | Rosenbloom | 148—6.15 X |
| 2,677,700 | 5/1954 | Jackson et al. | 252—353 X |
| 2,809,906 | 10/1957 | Baecker et al. | 148—6.15 |
| 3,054,753 | 9/1962 | Hurt et al. | 252—99 |
| 3,090,709 | 5/1963 | Henricks | 117—127 X |

OTHER REFERENCES

Technical data on Wyandotte "Pluronic" TP 149, W9t, "Metal Cleaning Formulation," Jan. 7, 1957, pp. 1–4 and 9.

LEON D. ROSDOL, *Primary Examiner.*

ALBERT T. MEYERS, *Examiner.*

M. WEINBLATT, *Assistant Examiner.*